(12) United States Patent
Daniels

(10) Patent No.: US 10,996,078 B2
(45) Date of Patent: May 4, 2021

(54) C-SHAPED CYLINDRICAL CORE FOR LINEAR VARIABLE DIFFERENTIAL TRANSFORMER (LVDT) PROBES

(71) Applicant: Honeywell International Inc., Morris Plains, NJ (US)

(72) Inventor: Aaron Daniels, Echo, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 210 days.

(21) Appl. No.: 15/809,853

(22) Filed: Nov. 10, 2017

(65) Prior Publication Data

US 2019/0145797 A1 May 16, 2019

(51) Int. Cl.
| | |
|---|---|
| G01D 5/22 | (2006.01) |
| H01F 3/00 | (2006.01) |
| H01F 21/06 | (2006.01) |
| H01F 27/24 | (2006.01) |
| H01F 1/147 | (2006.01) |
| H01F 27/28 | (2006.01) |

(52) U.S. Cl.
CPC ......... *G01D 5/2216* (2013.01); *G01D 5/2291* (2013.01); *H01F 1/14708* (2013.01); *H01F 3/00* (2013.01); *H01F 21/06* (2013.01); *H01F 27/24* (2013.01); *H01F 27/28* (2013.01)

(58) Field of Classification Search
None
See application file for complete search history.

(56) References Cited

U.S. PATENT DOCUMENTS

| | | | | |
|---|---|---|---|---|
| 2,427,866 | A * | 9/1947 | Macgeorge | G01B 7/24 336/136 |
| 3,090,015 | A * | 5/1963 | Scharfman | H01P 1/19 333/24.1 |
| 3,262,027 | A | 7/1966 | Zaleske et al. | |
| 3,947,788 | A | 3/1976 | Berry | |

(Continued)

FOREIGN PATENT DOCUMENTS

| | | |
|---|---|---|
| DE | 19806917.0 A1 | 8/1998 |
| EP | 0205754 A2 | 12/1986 |

(Continued)

OTHER PUBLICATIONS

Zexel Corp [JP]; Core arrangement of linear displacement sensor for corn element; DE19806917 {A 1); Aug. 27, 1998; G01B7/00; G01D5I20; (Year: 1998).*

(Continued)

*Primary Examiner* — Nasima Monsur
(74) *Attorney, Agent, or Firm* — Alston & Bird LLP

(57) ABSTRACT

Apparatus and associated methods relate to a linear variable differential transformer (LVDT) probe. The LVDT probe includes a plunger rod and a metal sheet formed into a cylinder with a C-shaped cross-section, the metal sheet configured to couple to the plunger rod. In an illustrative example, the coupling may be an interference fit aided by spring retention forces of the metal sheet. The metal sheet may be stamped, formed and applied to the plunger rod without annealing. In another example, the C-shaped metal sheet may be welded to the plunger rod at a distal and/or proximal end. The ratio of relative electromagnetic permeability of the metal sheet to the plunger rod may be greater than 10.

19 Claims, 13 Drawing Sheets

(56) References Cited

U.S. PATENT DOCUMENTS

| | | | |
|---|---|---|---|
| 5,546,948 A * | 8/1996 | Hamm | A61B 5/6848 600/463 |
| 2007/0200559 A1 | 8/2007 | Proksch et al. | |
| 2013/0312506 A1 | 11/2013 | Nielsen et al. | |
| 2014/0084930 A1 * | 3/2014 | Dodds | G01V 3/17 324/331 |
| 2015/0008906 A1 | 1/2015 | Briefer et al. | |

FOREIGN PATENT DOCUMENTS

| | | |
|---|---|---|
| KR | 20120073149 A | 7/2012 |
| WO | 2016094865 A1 | 6/2016 |

OTHER PUBLICATIONS

Veh Herbert [DE]; Ferromagnetic core for an inductive position sensor; EP0205754 {A2} ; Elektroteile GMBH [DE]; H01F29/10; H01F3/14; Dec. 30, 1986; (Year: 1986).*

International Search Report in related Foreign Application PCT/US2018/059725, dated Feb. 22, 2019, 4 pages.

Written Opinion of the International Searching Authority in related Foreign Application PCT/US2018/059725, dated Feb. 22, 2019, 6 pages.

* cited by examiner

US 10,996,078 B2

C-SHAPED CYLINDRICAL CORE FOR LINEAR VARIABLE DIFFERENTIAL TRANSFORMER (LVDT) PROBES

TECHNICAL FIELD

Various embodiments relate generally to displacement sensors.

BACKGROUND

Electronic sensors may detect various environmental parameters and generate a response signal. For example, pressure sensors may detect pressure in industrial pipelines. Temperature sensors may detect an ambient environmental temperature or may detect, for example, a temperature in a chamber. Accelerometers may detect vibration or shock, and may, for example, deploy automobile airbags. Displacement sensors may detect linear or angular displacement. Motion sensors may turn on lights in response to detecting the motion of people, for example.

Displacement sensors may be implemented in a variety of applications. In pressure measurement applications, a pressurized vessel, for example, an oil line, may include a diaphragm that moves outward in response to pressure and inward in response to vacuum. A displacement sensor may be coupled to the diaphragm to measure the pressure in the line, by measuring the displacement of the diaphragm.

SUMMARY

Apparatus and associated methods relate to a linear variable differential transformer (LVDT) probe including a plunger rod and a metal sheet formed into a cylinder with a C-shaped cross-section, configured to couple to the plunger rod. In an illustrative example, the coupling may be an interference fit aided by spring retention forces of the metal sheet. The metal sheet may be stamped, formed and applied to the plunger rod without annealing. One or more longitudinal metal sheet edges may be rounded. The C-shaped metal sheet may be welded to the plunger rod at a distal and/or proximal end. In some examples, the longitudinal edges of the metal sheet may be welded together and/or to the plunger rod. The ratio of relative electromagnetic permeability of the metal sheet to the plunger rod may be greater than 10. Various implementations may advantageously reduce lot-to-lot variability and reduce the cost of producing LVDTs.

Various embodiments may achieve one or more advantages. For example, some embodiments may improve durability, reducing the risk of damage during manufacture and during field use. Some implementations may increase reliability especially in high-vibration environments. In dual channel LVDT examples, higher channel-to-channel correlation (e.g., better tracking) may be achieved. Some embodiments may exhibit lower variability of output sensitivity and/or linearity due to temperature extremes (e.g., lower temperature coefficient). In various examples, overall outer diameter may decrease, which may reduce apparatus weight and may reduce overall size and weight of end-use applications. Some embodiments may enable low cost manufacturing processes such as metal stamping, forming and press-fitting. These manufacturing processes may be automated, further reducing cost.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 5:
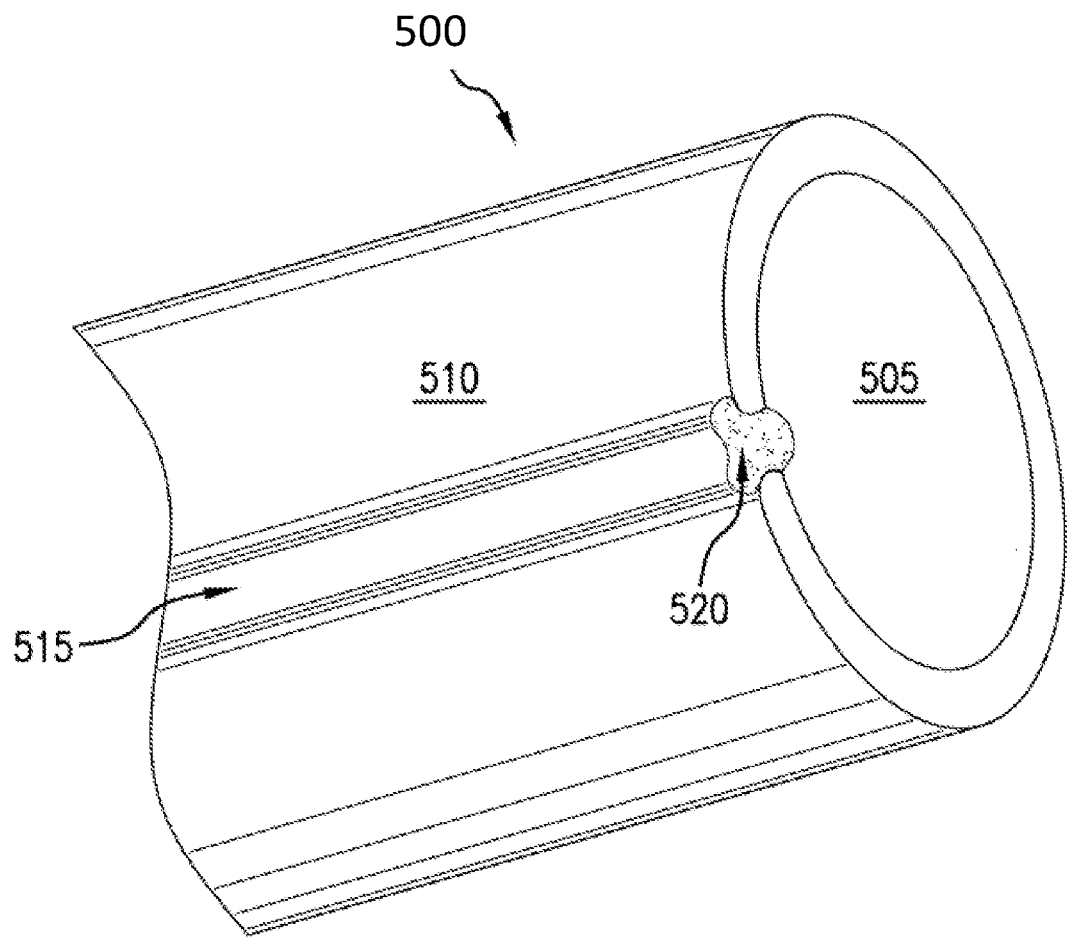
FIG. 5 depicts a perspective view of a distal end of an exemplary LVDT probe illustrating a single weld.
Figure 6:
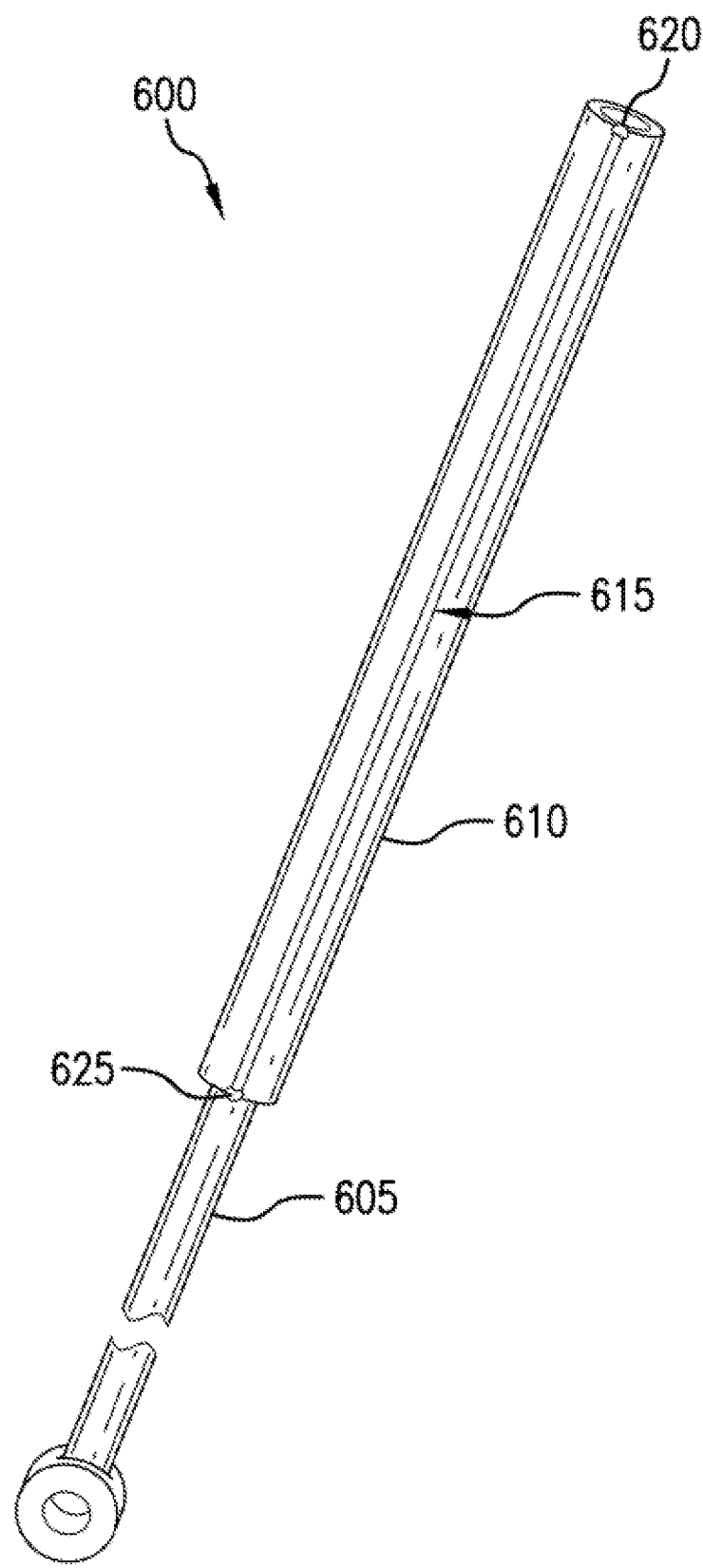
FIG. 6 depicts a perspective view of exemplary distal and proximal point welds between an LVDT core and rod.
Figure 7:
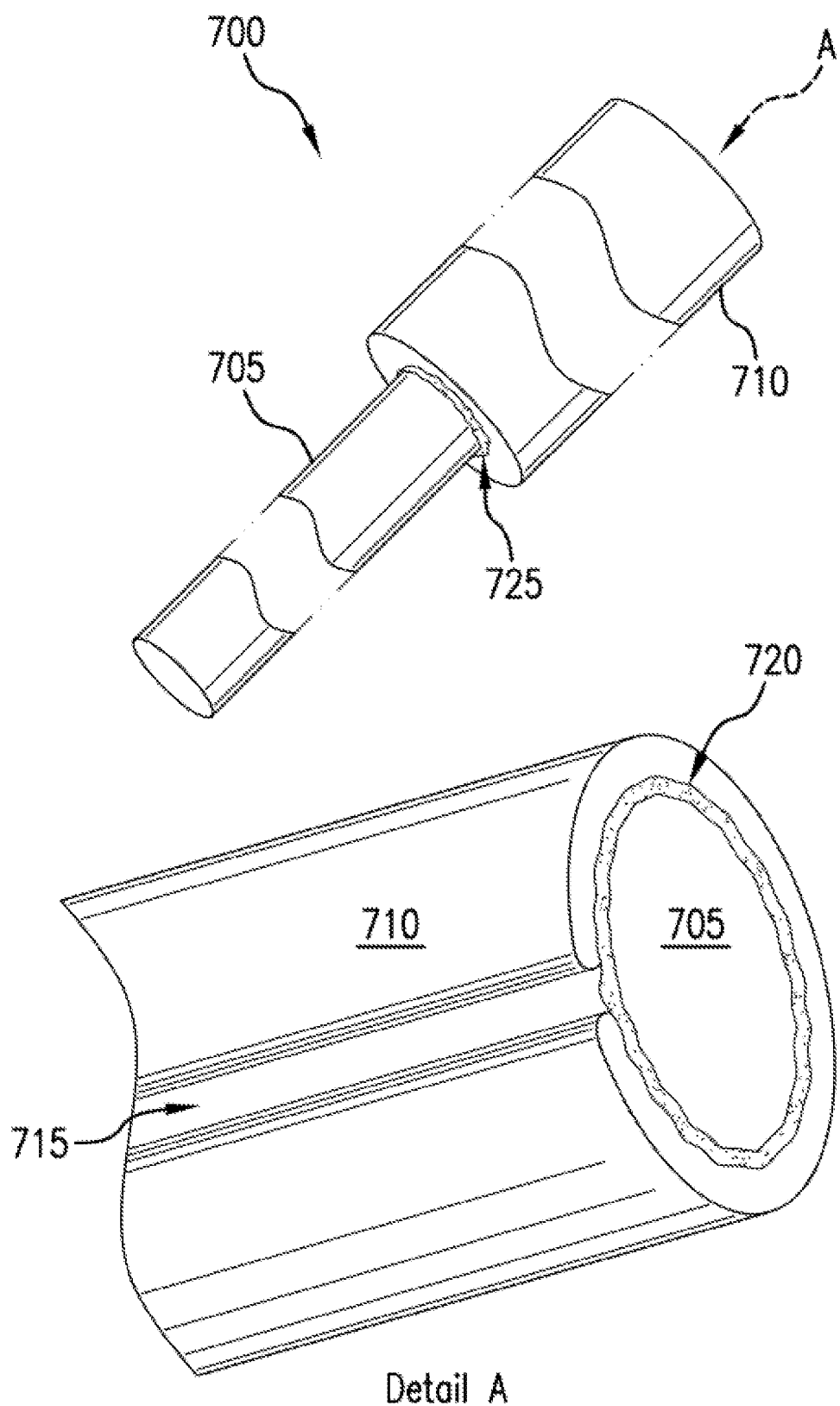
FIG. 7 depicts perspective views of exemplary distal and proximal circumferential welds between an LVDT core and shaft.

To aid understanding, this document is organized as follows. First, a use-case scenario illustrating an exemplary C-shaped core retained on a plunger rod of a linear variable differential transformer (LVDT) is briefly introduced with reference to FIG. 1A. FIG. 1B further explains the construction of an exemplary LVDT. Next, with reference to FIG. 2, the discussion turns to an exemplary embodiment that illustrates the C-shaped core and its relationship to the plunger rod within an LVDT. Next, various exemplary rounding features of the corners and edges of the core materials are detailed in FIGS. 3 and 4. Next, FIGS. 5-12 show various exemplary retention methods. Specifically, FIGS. 5, 6 and 7 depict exemplary end-welds, FIG. 8 an exemplary longitudinal weld, FIG. 9 an exemplary retention clip, FIG. 10 an exemplary static friction enhancement feature, FIG. 11 exemplary adhesive, and FIG. 12 an exemplary end-stop feature.

Figure 1A:
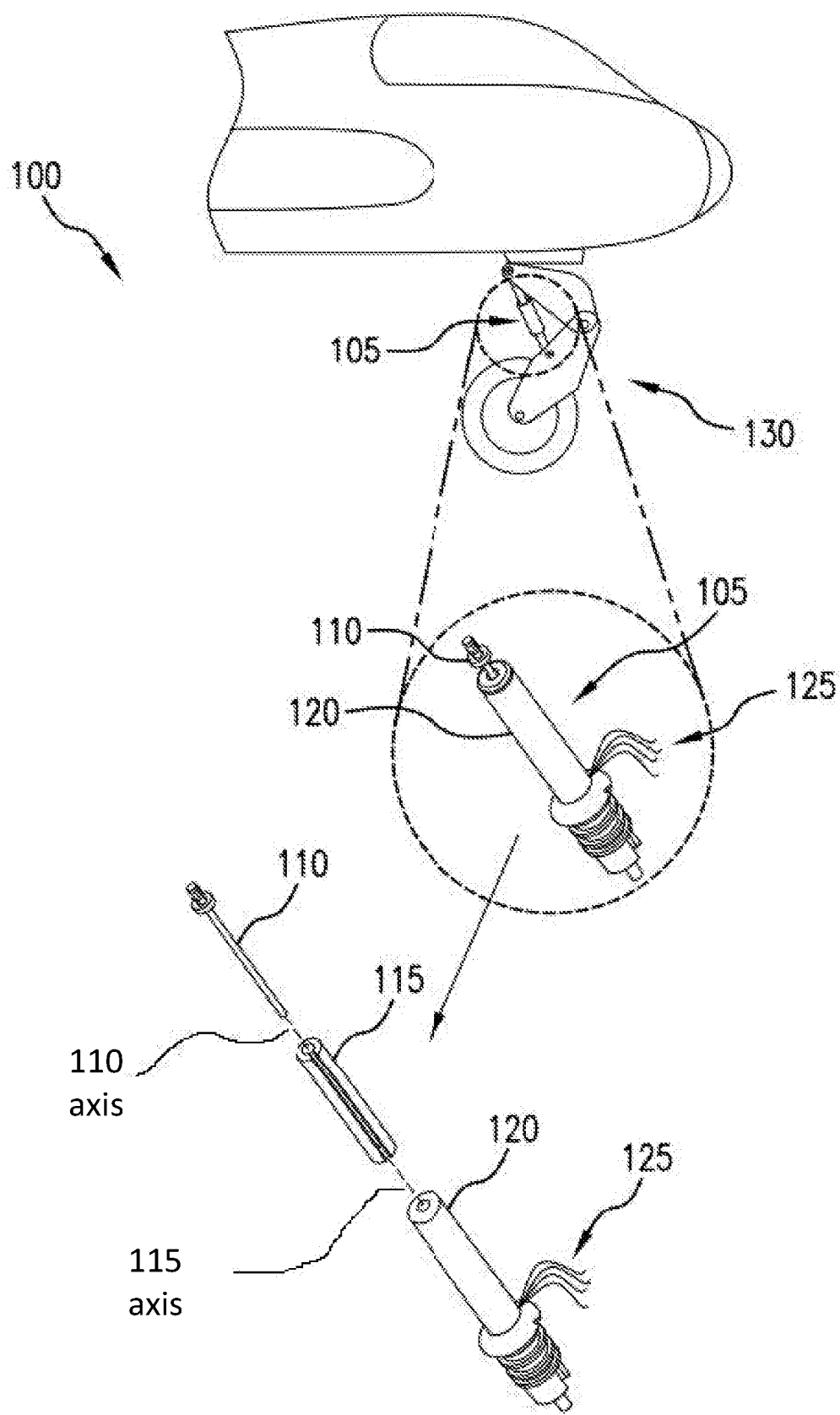
FIG. 1A depicts an exemplary C-shaped probe core within a linear variable differential transformer (LVDT) measuring a deployment status of a landing gear assembly on an aircraft.
Figure 1B:
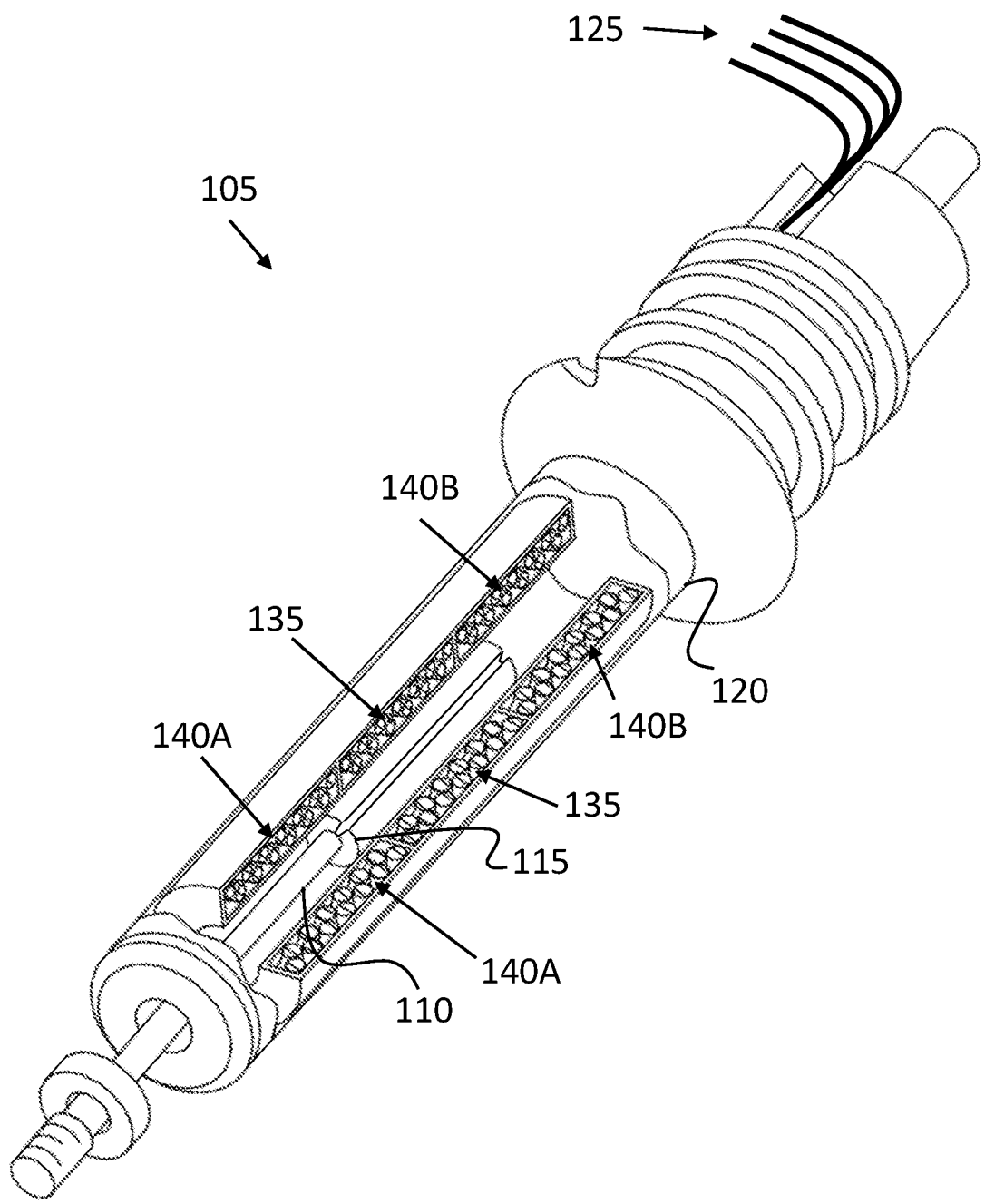
FIG. 1B depicts an exemplary LVDT.

FIG. 1A depicts an exemplary C-shaped probe core within a linear variable differential transformer (LVDT) measuring a deployment status of a landing gear assembly on an aircraft. An LVDT use-case scenario 100 includes an LVDT 105. The LVDT includes a plunger-probe 110. A C-shaped core 115 is coupled to the plunger-probe 110. In some examples, the C-shaped core 115 may couple to the plunger-probe 110 with an interference fit. The C-shaped core 115 may possess an electromagnetic permeability greater than unity. In some examples, the C-shaped core 115 may possess electromagnetic permeability at least 10 times greater than the electromagnetic permeability of the plunger-probe 110.

In some examples, the C-shaped core 115 may be fabricated from a sheet of metal that is substantially thin. The substantially thin sheet of metal may advantageously minimize an outer diameter of the C-shaped core 115 assembled onto the plunger-probe 110. The plunger-probe 110 coupled to the C-shaped core 115 is slidably engaged with a core housing 120. The core housing 120 includes an excitation-sense harness 125. The minimized outer diameter of the C-shaped core 115 may be a starting point for optimizing the overall diameter of the core housing 120. Accordingly, the substantially thin sheet of metal included in the C-shaped core 115 may advantageously enable designs of LVDTs 105 with small outer diameters.

The LVDT 105 is coupled to a landing gear assembly 130. The deployment state of the landing gear assembly 130 may be sensed by the LVDT 105. The LVDT 105 may be coupled to a flight control panel within an aircraft to indicate the deployment state of the landing gear 130.

FIG. 1B depicts an exemplary LVDT. The LVDT 105 includes the plunger-probe 110. The plunger-probe 110 couples to the C-shaped core 115. The plunger-probe 110 extends outside the core housing 120. The C-shaped core 115 is surrounded by an excitation winding 135 (primary) and a pair of sense windings 140A, 140B (secondary). The windings 135, 140A an 140B are coupled to the excitation-sense harness 125. The windings 135, 140A and 140B reside inside the core housing 120. The excitation-sense harness 125 extends from external to the core housing 120 to the windings 135, 140A and 140B inside the core housing 120.

The excitation winding 135 may produce a magnetic field in response to an excitation signal. The sense windings 140A and 140B may be magnetically coupled to the magnetic field, and may produce an electrical output signal in response to the magnetic field coupling. The magnetic field coupling may vary based on the location of the C-shaped core 115 within the core housing 120. Accordingly, the electrical output signal from the sense windings 140A and 140B may vary in response to the longitudinal location of the C-shaped core 115 relative to the windings 135, 140A and 140B.

In an illustrative example, an excitation signal is applied to the excitation winding 135 via the excitation-sense harness 125. As the plunger-probe 110 slides within the core housing 120, the electrical output signal produced is sent out from the excitation-sense harness 125. In some examples, a processing module may be electrically coupled to the excitation-sense harness 125. The electrical output signal produced by the LVDT may be detected by the processing module. Accordingly, the processing module may determine a linear position of the plunger-probe 110. In the LVDT use-case scenario 100, an aircraft pilot may determine the deployment status of the landing gear assembly 130 based on a resulting output from the processing module.

Figure 2:
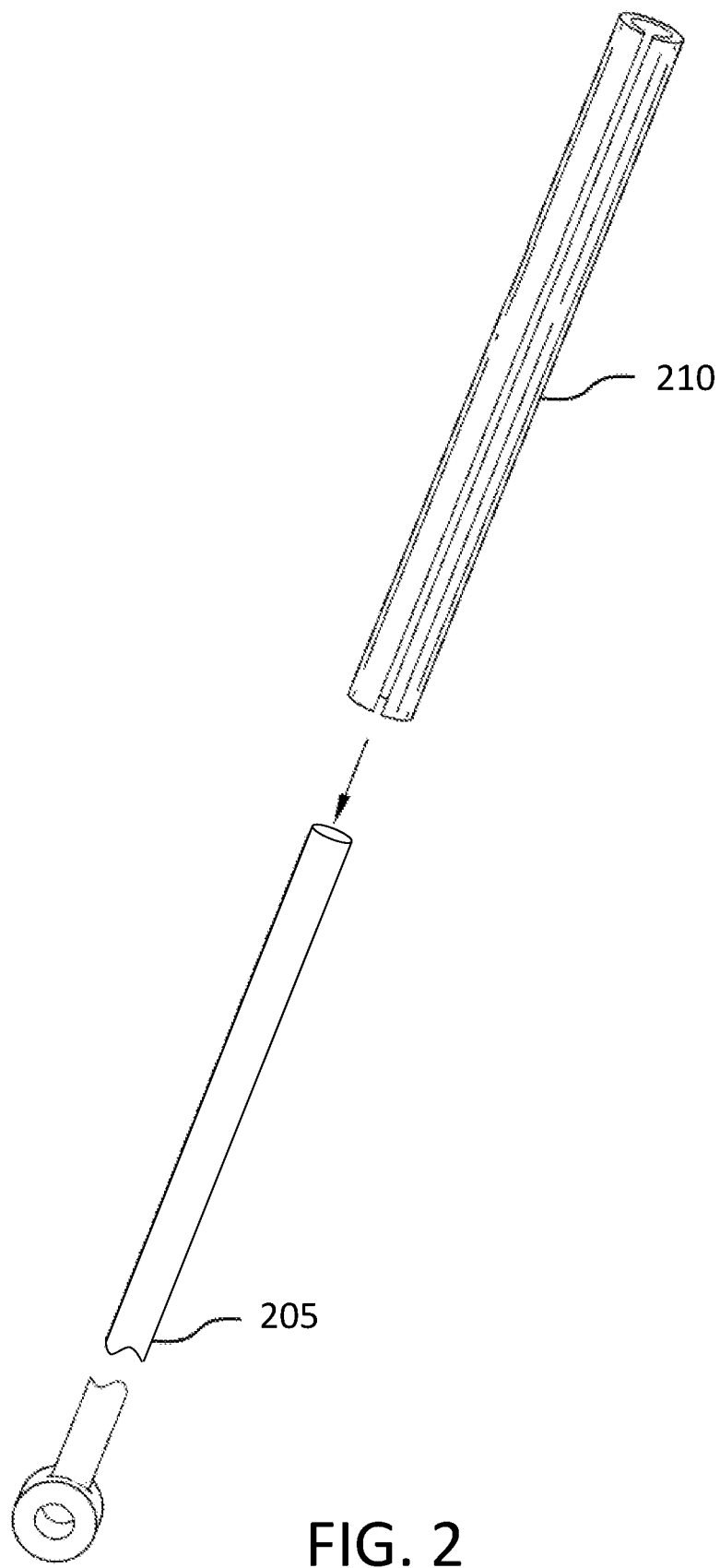
FIG. 2 depicts a perspective exploded view of an exemplary LVDT probe.

FIG. 2 depicts a perspective exploded view of an exemplary LVDT probe. An LVDT probe rod 205 couples to a core 210. The core 210 may be stamped from a metal sheet. In some examples, the core 210 may be die cut from a metal sheet. Further, the core 210 may be laser cut from a metal sheet.

The core 210 is further formed into a cylindrical shape. By way of example and not limitation, the forming process may include die forming, stamping or pressing. In some examples, the forming process may include rolling. In further examples, the forming process may include electrical discharge machining (EDM).

The inner diameter of the core 210 in a cylindrical shape may be smaller than the outer diameter of the probe rod 205. The cross-section of the core 210 may be a C-shape. The core 210 may be press-fit using an arbor press, for example, onto the probe rod 205. In some examples, the core 210 may be press-fit using an automated method. The spring force inherent in the metal sheet may provide the grip to hold the core 210 onto the probe rod 205. Use of the core 210 fabricated from a metal sheet, may reduce a final outer diameter of an LVDT assembly (e.g., FIG. 1A, item 105). The spring force may retain the core 210 on the cylindrical rod (e.g., the probe rod 205).

In some examples, the core 210 may be assembled onto the probe rod 205 without press-fitting. For example, the core 210 may be wrapped around the probe rod 205. After the wrapping operation, the core 210 may be squeezed to secure it to the probe rod 205. The core 210 may be cinched to firmly bind the core 210 to the probe rod 205.

In some examples, the core 210 may be slid onto the probe rod 205 without press-fitting. The slid-on core 210 may be welded to the probe rod 205. In some examples, the core 210 may be crimped to the probe rod 205.

The wrapping operation may retain the core 210 on the cylindrical rod (e.g., the probe rod 205). The squeezing operation may retain the core 210 on the cylindrical rod (e.g., the probe rod 205). Cinching may retain the core 210 on the cylindrical rod (e.g., the probe rod 205). Welding may retain the core 210 on the cylindrical rod (e.g., the probe rod 205). Crimping may retain the core 210 on the cylindrical rod (e.g., the probe rod 205).

In an illustrative example, an LVDT assembly (e.g., FIG. 1A, item 105) including the core 210 coupled to the probe rod 205 may be placed in an aircraft engine to measure oil pressure. The LVDT assembly within the aircraft engine may experience substantially high vibrations. The term "substantially" in this case may be up to 400 g (acceleration due to gravity). The core 210 may be retained on the probe rod 205 by the spring force within the metal of the core 210 in conjunction with the static friction between the probe rod 205 and the core 210.

Some embodiments may improve durability of the core 210, which may advantageously reduce the risk of damage to the core 210 during manufacture and during field use. In an illustrative example, characteristics of a core (e.g. 210) may be resistant to the effects of scratches, along the core surface, due to an anneal-free process. The anneal-free process may mitigate the enlargement of grains contained within the core. Mitigation of grain enlargement may produce a more consistent permeability within a core. Further, by retaining finer grains the grain distribution is averaged out, which may advantageously reduce the lot-to-lot variation, making the cores consistent from part-to-part and lot-to-lot.

Figure 3:
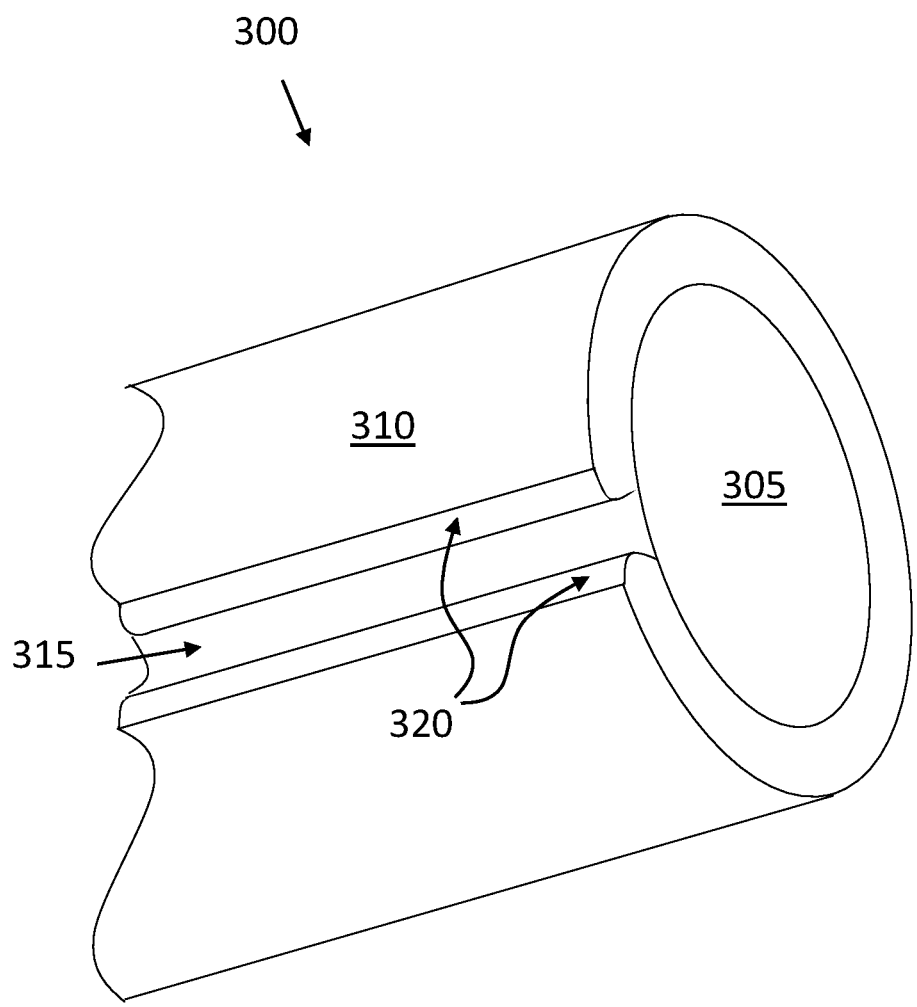
FIG. 3 depicts a perspective view of a distal end of an exemplary LVDT probe.

FIG. 3 depicts a perspective view of a distal end of an exemplary LVDT probe. An LVDT probe assembly 300 includes a shaft 305 and a slug 310. In some examples, the slug 310 may be a core (e.g., FIG. 2, item 210). The slug 310 includes a longitudinal slotted opening 315. The slug 310 includes a longitudinal edge 320 on each side of the longitudinal slotted opening 315. The longitudinal edges 320 may be rounded. In various embodiments, the rounding of the edges 320 may be completed with a manufacturing process that removes material on the corners of the edges 320, creating an edge 320 with a radius. The radius on the longitudinal edges 320 may advantageously allow welding to both edges 320 with a single weld, if welds are implemented. In addition, the radius may provide a groove to reduce the profile of a weld, if welds are implemented. Further, rounded edges 320 may advantageously reduce weld stress.

Figure 4:
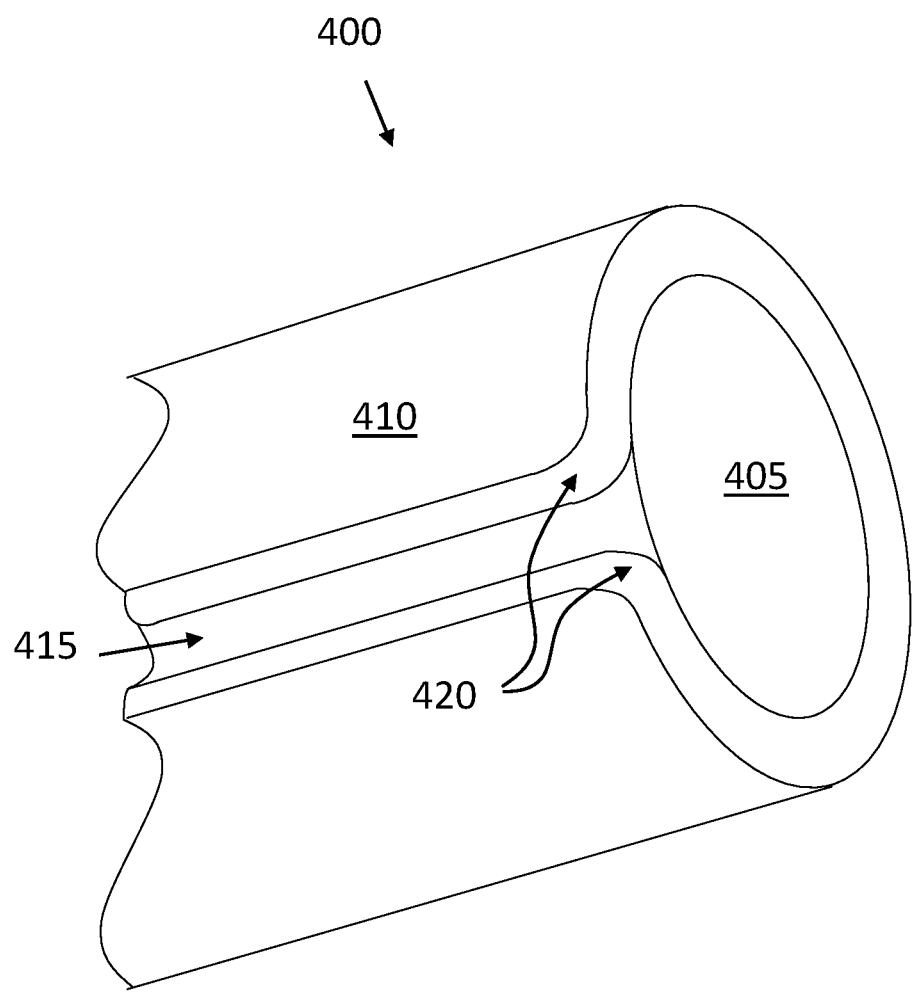
FIG. 4 depicts a perspective view of a distal end of an exemplary LVDT probe illustrating chamfered corners on a probe core.

FIG. 4 depicts a perspective view of a distal end of an exemplary LVDT probe illustrating chamfered corners on a probe core. An LVDT probe assembly 400 includes a shaft 405 and a slug 410. The slug 410 includes a longitudinal slotted opening 415. The slug 410 includes a corner 420 on a distal end of each side of the longitudinal slotted opening 415. The corners 420 are rounded (include a radius). The radius on the corners 420 may advantageously provide space for an end-weld, if one is implemented.

FIG. 5 depicts a perspective view of a distal end of an exemplary LVDT probe illustrating a single weld. An LVDT probe assembly 500 includes a shaft 505 and a C-shaped core 510. The C-shaped core 510 includes a longitudinal gap 515. The C-shaped core 510 includes a radial weld 520 on a distal end of the longitudinal gap 515. The radial weld 520 may advantageously secure the core 510 to the shaft 505. In some examples, the LVDT probe assembly 500 may be a plunger assembly. In some examples, the radial weld 520 may be an end-weld. Various radial welds 520 may retain the C-shaped core 510 on the cylindrical rod (e.g., shaft 505).

FIG. 6 depicts a perspective view of exemplary distal and proximal point welds between an LVDT core and rod. An LVDT probe assembly 600 includes a rod 605 and a C-shaped core 610. The C-shaped core 610 includes a longitudinal gap 615. The C-shaped core 610 includes a weld 620 on a distal end of the longitudinal gap 615. The C-shaped core 610 includes a weld 625 on a proximal end of the longitudinal gap 615. The welds 620 and 625 may be keyhole welds. In some examples, the welds 620 and 625 may be various other welds (e.g., spot, machine, laser, Tungsten Inert Gas (TIG), Gas Tungsten Arc Welding (GTAW)). In some examples, the welds 620 and 625 may be laser welds. In some examples, the welds may bond the rod 605 to the C-shaped core 610.

FIG. 7 depicts perspective views of exemplary distal and proximal circumferential welds between an LVDT core and shaft. An LVDT probe assembly 700 includes a shaft 705 and a core sleeve 710. The core sleeve 710 includes a longitudinal gap 715. A perimeter weld 720 is implemented on the distal end of the core sleeve 710. A perimeter weld 725 is also implemented on the proximal end of the core sleeve 710. The perimeter welds may advantageously prevent slippage of the core sleeve 710 from the shaft 705. Various perimeter welds 720 may retain the core sleeve 710 on the cylindrical rod (e.g., shaft 705).

In various embodiments, the distal perimeter weld 720 may exist without the proximal perimeter weld 725. Implementation of the distal perimeter weld 720 without the proximal perimeter weld 725 may reduce the profile of the LVDT probe assembly 700.

Further, the proximal perimeter weld 725 may exist without the distal perimeter weld 720. Implementation of the proximal perimeter weld 725 without the distal perimeter weld 720 may provide additional spacing from the distal end of the LVDT probe assembly 700 to a core housing (e.g., FIG. 1A, item 120). Placing the welds 720 and 725 on one end may save cost, reduce the risk of foreign object debris (FOD), yet securely hold the core sleeve 710 onto the shaft 705. In some implementations, no additional welds may be applied, which may advantageously further reduce cost, and further reduce the risk of FOD. Due to the spring retention along the length of the core sleeve 710, the core sleeve 710 may be held securely to the shaft 705.

Figure 8:
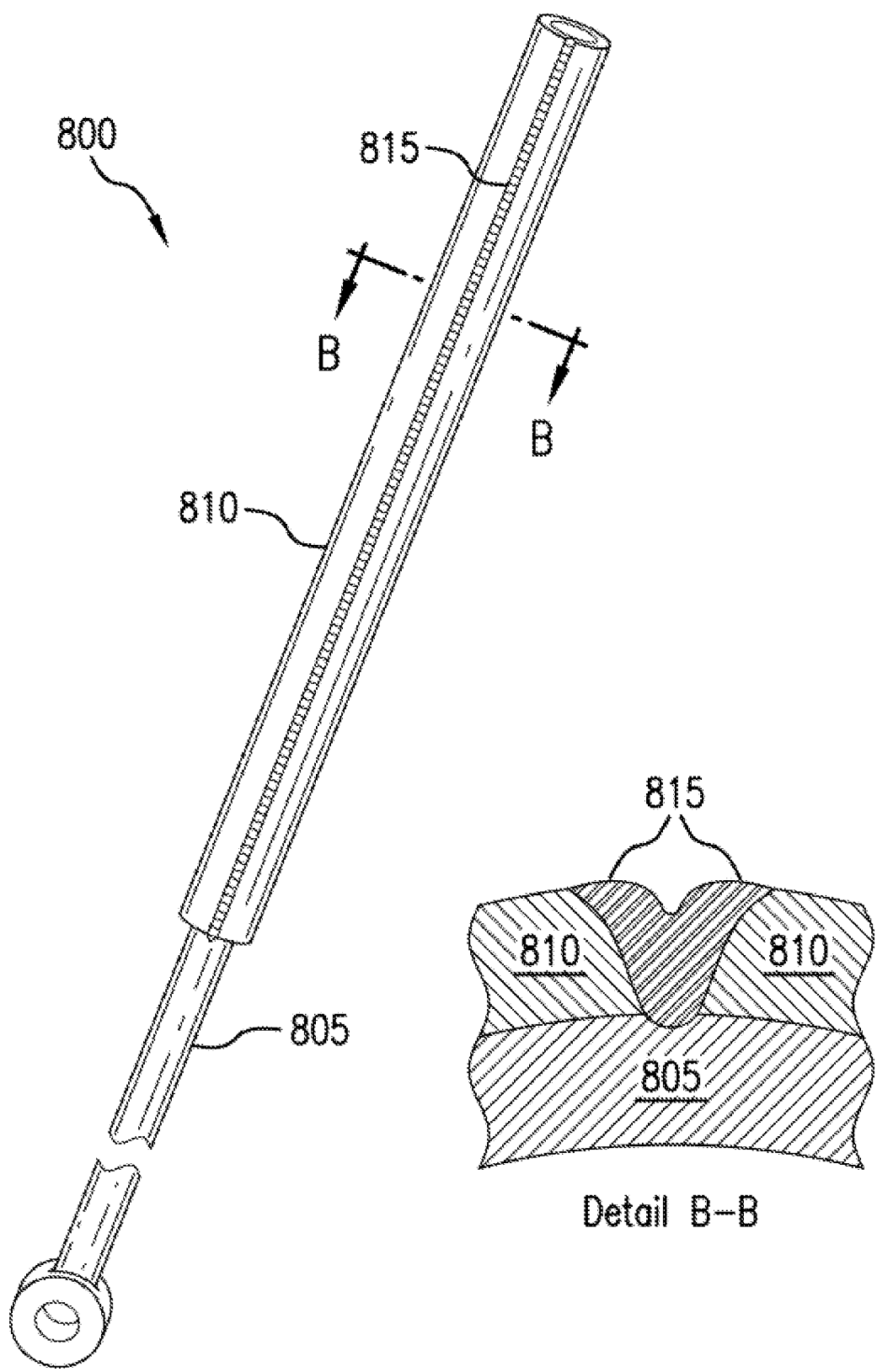
FIG. 8 depicts a perspective view of an exemplary longitudinal weld between an LVDT core and rod.

FIG. 8 depicts a perspective view of an exemplary longitudinal weld between an LVDT core and rod. An LVDT probe assembly 800 includes a shaft 805 and a core sleeve 810. The core sleeve 810 includes a longitudinal gap (e.g., FIG. 3, item 315). A longitudinal weld 815 is implemented along the longitudinal gap of the core sleeve 810. As shown in DETAIL B-B, the longitudinal weld 815 may penetrate the core sleeve 810 and into the shaft 805. The longitudinal weld 815 may securely hold the core sleeve 810 to the shaft 805. Various longitudinal welds 815 may retain the core sleeve 810 on the cylindrical rod (e.g., shaft 805).

Figure 9:
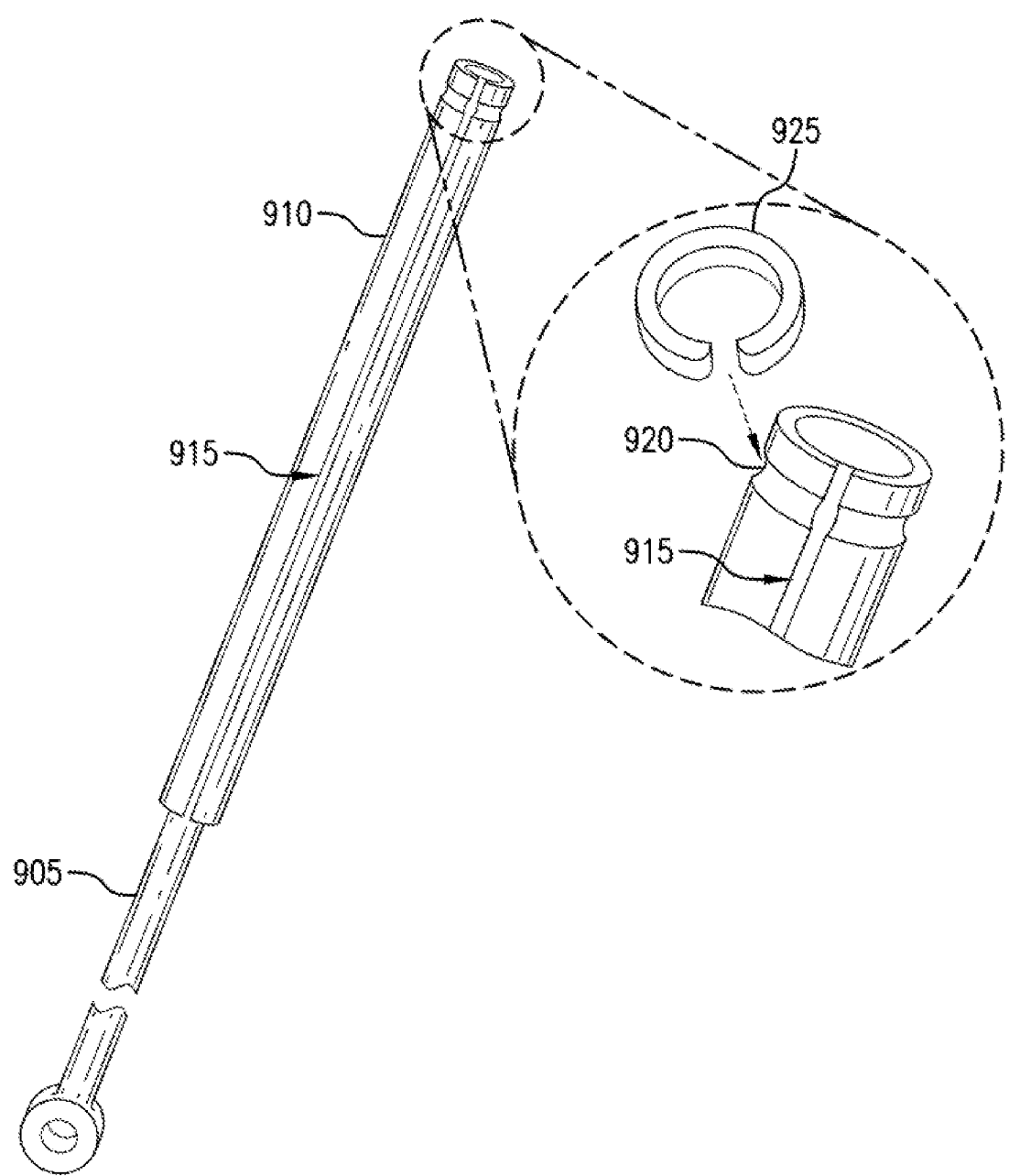
FIG. 9 depicts a perspective view of an exemplary core clip applied to an LVDT core.

FIG. 9 depicts a perspective view of an exemplary core clip applied to an LVDT core. An LVDT probe assembly 900 includes a shaft 905 and a core sleeve 910. The core sleeve 910 includes a longitudinal gap 915. On the distal end of the LVDT probe assembly 900, a groove 920 is circumscribed around the core sleeve 910. The groove 920 retains a clip 925. The core sleeve 910 may be advantageously secured to the shaft 905 at least in-part by the spring force of the clip 925. Various clips (e.g., 925) may retain the core sleeve 910 on the cylindrical rod (e.g., the shaft 905).

Figure 10:
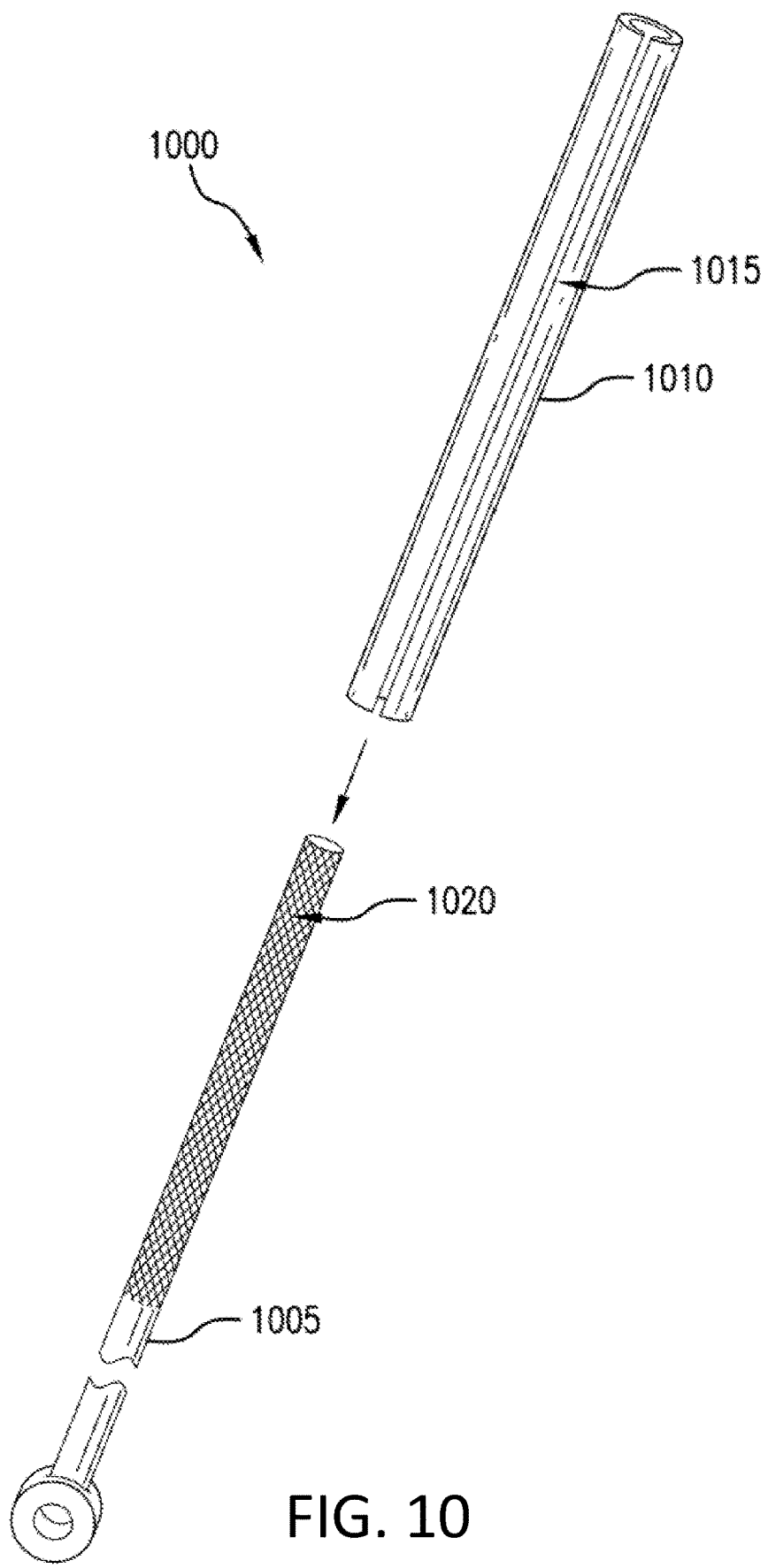
FIG. 10 depicts a perspective view of an exemplary LVDT probe with a knurled rod for retention of a core.

FIG. 10 depicts a perspective view of an exemplary LVDT probe with a knurled rod for retention of a core. An LVDT probe assembly 1000 includes a rod 1005 and a core sleeve 1010. The core sleeve 1010 includes a longitudinal gap 1015. The rod 1005 includes a knurling pattern 1020. The knurling pattern 1020 may advantageously increase the static friction between the rod 1005 and the core sleeve 1010. The increased friction may hold the core sleeve 1010 securely in place in high vibration environments. Various knurling patterns (e.g., 1020) may retain the core sleeve 1010 on the rod 1005. Further, various friction enhancement methods (e.g., sanding, sandblasting, soda-blasting, laser etching, chemical etching) may retain the core sleeve 1010 on the cylindrical rod 1005.

Figure 11:
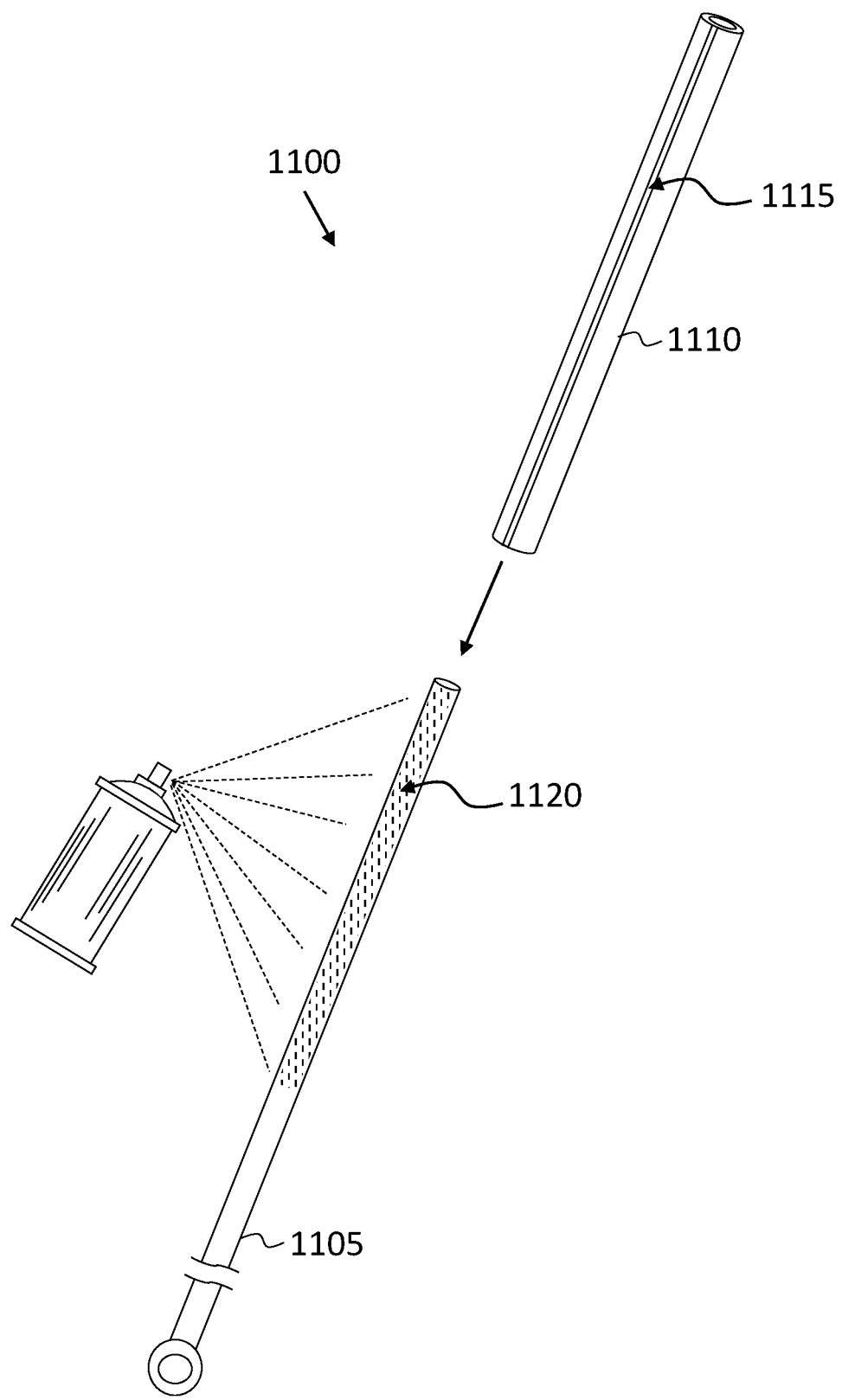
FIG. 11 depicts a perspective view of an exemplary LVDT probe illustrating application of adhesive for retention of a core.

FIG. 11 depicts a perspective view of an exemplary LVDT probe illustrating application of adhesive for retention of a core. An LVDT probe assembly 1100 includes a rod 1105 and a core sleeve 1110. The core sleeve 1110 includes a longitudinal gap 1115. The rod 1105 includes adhesive 1120. The adhesive 1120 may advantageously increase the bond between the rod 1005 and the core sleeve 1010. The increased bond may hold the core sleeve 1010 securely in place in high vibration environments. Adhesives (e.g., 1120) may retain the core sleeve 1110 on the rod 1105.

Figure 12:
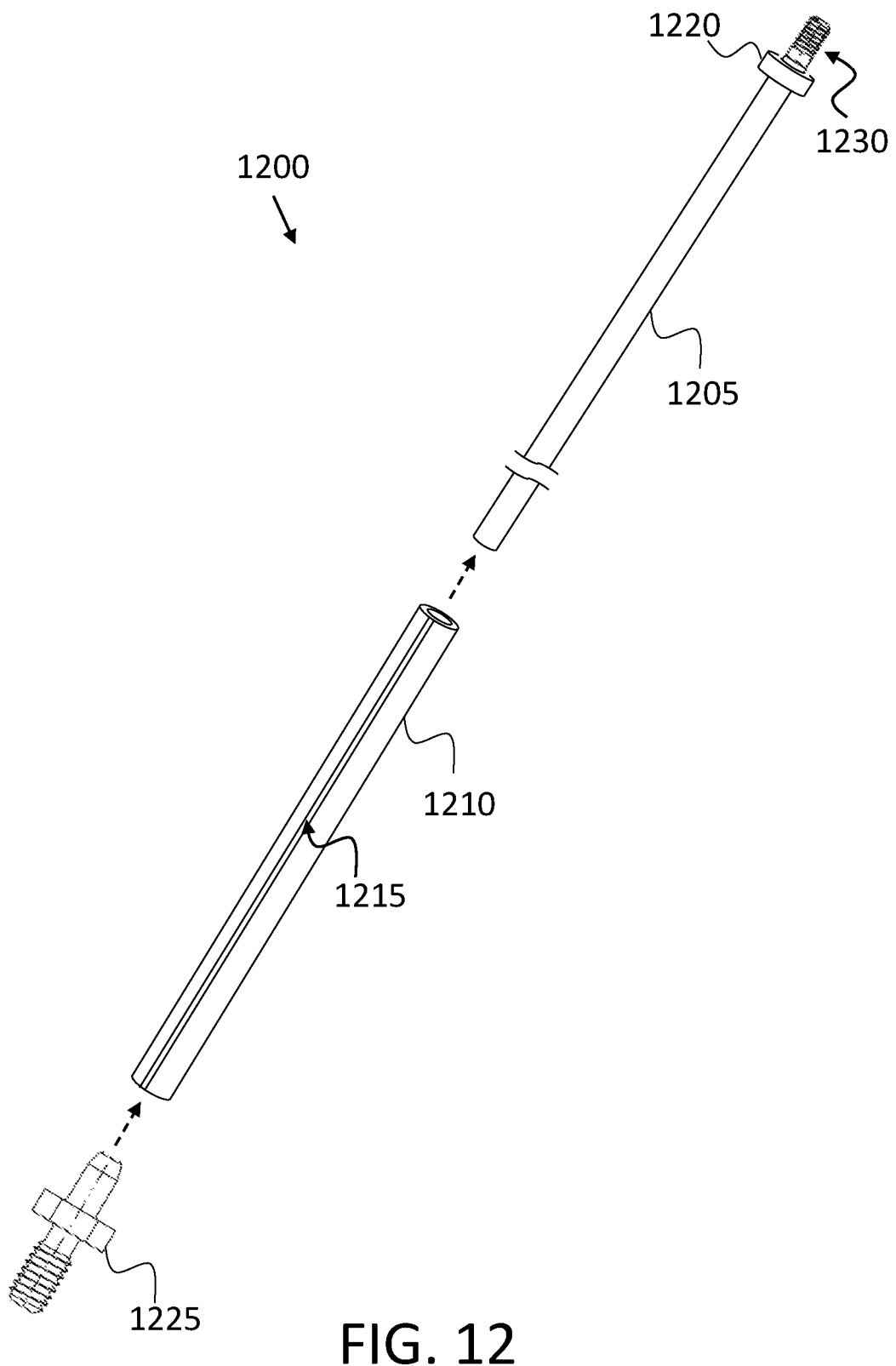
FIG. 12 depicts a perspective view of an exemplary LVDT probe illustrating use of an end-stop and a press-fit application of a core from a proximal end.

FIG. 12 depicts a perspective view of an exemplary LVDT probe illustrating use of an end-stop and a press-fit application of a core from a proximal end. An LVDT probe assembly 1200 includes a plunger rod 1205 and a sleeve core 1210. The sleeve core 1210 includes a longitudinal gap 1215. The plunger rod 1205 is fixedly coupled to an end-stop 1220. The diameter of the end-stop 1220 may be less than or equal to the outer diameter of the sleeve core 1210 when the sleeve core 1210 is in an assembled state press-fit onto the plunger rod 1205.

During assembly of the LVDT probe assembly 1200, the sleeve core 1210 is press-fit onto the plunger rod 1205 until it seats against the end-stop 1220. The end stop may be configured to prevent movement of the sleeve core 1210 off the end of the plunger rod 1205. In some examples, the plunger rod 1205 may be tapered such that the narrower end is the distal end with the end-stop 1220. Movement of the sleeve core 1210 toward the proximal end may be mitigated by a larger outer diameter on the plunger rod 1205. Further, movement of the sleeve core 1210 toward or off from the distal end may be mitigated by the end-stop 1220.

Once the sleeve core 1210 is press-fit onto the plunger rod 1205, a probe coupling 1225 may be coupled to the plunger rod 1205. The plunger rod 1205 includes a threaded end 1230. In some examples, the plunger rod 1205 and the threaded end 1230 are unitary in construction. Various end-stop features (e.g., 1220) may retain the sleeve core 1205 on the plunger rod 1205.

Although various embodiments have been described with reference to the figures, other embodiments are possible. For example, early in the fabrication process, a LVDT core in a flat sheet state may be stamped with a press. The press may stamp the core one or more times. The multiple stamping process may cause the grains within the LVDT core in the flat sheet state to break up and become finer. The fine grains may average out the grain domains within the LVDT core in the flat sheet state. This averaging may advantageously mitigate lot-to-lot variations in the magnetic properties of the LVDT core in the flat sheet state. Low lot-to-lot variations may advantageously allow field repair personnel to, for example, swap out failed LVDTs for new LVDTs without calibration and without sorting for electrical characteristics.

Various implementations may mitigate null shifting. An LVDT C-shaped core may be interference fitted to a plunger rod. The interference fit may enable an inherent spring force within the core material to retain the core on the plunger rod without welding. When the welding operation is omitted, ionic carbide lines may be avoided. Without ionic carbide lines, the stresses involved in high temperature applications may also be reduced, which may advantageously mitigate null shifting (e.g., shifting of the core). In an illustrative example, a dual channel LVDT is installed in a turbine generator. The design may rely on the tracking between the two channels for detection of minute differences in linear displacement. As the temperature within the generator rises, the weldless design of the dual channel LVDT allows the C-shaped cores to stay in place on the plunger rods. The mitigated null-shift effect provides monitoring electronics to detect true differential movement between the LVDT channels.

In various embodiments, a starting core material may be a metal sheet. By way of example and not limitation, the metal sheet may be about 0.005", 0.006", 0.007", 0.008", 0.009", 0.010", 0.011", 0.012", 0.013", 0.014", 0.015", 0.016", 0.017", 0.018", 0.019", 0.020", 0.021", 0.022", 0.023", 0.024", 0.025", 0.030", 0.03125", 0.035", 0.040", 0.045", 0.050", 0.055", 0.060", 0.0625", 0.065", 0.070", 0.075", 0.080", 0.085", 0.090", 0.095", 0.100", 0.125", 0.150", 0.175", 0.200", or up to at least about 0.250" or more. The sheet metal may be substantially thin. The term "substantially thin" may be defined as falling within the described thicknesses of the metal sheet.

In some examples, a starting core material may be a metal sheet. The metal sheet may be any ferromagnetic or martensitic material. In some examples, the core material may be a high permeability material. By way of example and not limitation, the material may include iron and nickel. The material may further include, for example, cobalt, gadolinium, dysprosium, permalloy, awaruite, wairakite, magnetite, copper, chromium, molybdenum and/or silicon. Accordingly, various alloys may be employed in various cores.

In various examples, a starting core material may be a metal sheet. The metal sheet may be formed by various methods. By way of example and not limitation, the forming process may include die forming, stamping, pressing, rolling or electrical discharge machining (EDM).

In some examples, a deep-draw forming process may be used on the metal sheet. In such examples, the high permeability metal sheet may be placed into a deep-draw stamping machine. The resulting deep-drawn part may be press-fit onto a plunger rod, and welded at the end. In some examples, the deep-drawn part may provide an interference fit with the plunger rod, and may be press-fit without the weld.

In various embodiments, an LVDT rod may include a longitudinal rib. The longitudinal rib may mate with a longitudinal gap on an LVDT core. The longitudinal rib and gap may advantageously key the assembly to ensure a consistent assembly orientation of the rib and gap. In some examples, the rib may mitigate rotational motion of the LVDT core. Various rib features may retain the LVDT core on the LVDT rod.

An LVDT with a plunger rod coupled to a C-shaped core, may be used in various aircraft flight controls, general engine controls, and within various power generation turbines. The C-shaped core may be used advantageously in high-vibration environments, and in high temperature applications. The C-shaped core may provide a high retention force on the plunger rod mitigating displacement on the rod in high vibration environments. The fine grains within the stamped core mitigates lot-to-lot variability, even in high temperature applications.

Since the C-shape magnetic core may be designed as a press-fit spring, the welding of the magnetic core to the probe rod may be optional. The C-shaped magnetic core design may reduce weight and may improve vibrational performance. The C-shape magnetic core may include a dual retention method when welded to the probe rod.

The magnetic core may be stamped in a press to be blanked and formed into a C-shaped cylinder. The stamping process may control the grain direction in the core blanks. Further, the C-shape magnetic core may be left in the un-annealed state. The un-annealed C-shape magnetic core may mitigate the effects of handling, scratching, dropping, mechanical endurance, and vibration on the sensitivity, linearity, and/or the output of an LVDT into which the C-shape magnetic core is assembled. In various examples, the C-shape magnetic core may be annealed to advantageously increase working voltage. Accordingly, the C-shape magnetic core may exhibit superior temperature performance and vibrational performance. Further the C-shape magnetic core may be produced with fewer processing steps, and may be low-cost.

An LVDT core may be "blank stamped" and "form stamped" which may advantageously control grain direction. After stamping and forming, the core may be pressed onto a probe rod to a desired position. In some examples, the core and probe rod assembly may include redundant retaining features (e.g., weld, braze, glue). The C-shape core may be welded on one or both ends, with either a single or multiple weld or braze pass. In some examples, a single pass weld and welding both ends with a single pass may reduce process cycle time. The C-shape core may be moved to a precise position on a rod prior to welding, brazing, and/or gluing. The C-shaped core may be positioned with a tool and/or embedded features such as threads on the probe rod or a probe fitting. Various LVDT core designs may be implemented on single or multi-channel LVDTs.

In some examples, the core 210 may be fixedly coupled to the cylindrical rod 205 in a non-slidable (e.g., retaining) relationship, which may prevent displacement of the core 210 relative to the cylindrical rod 205 during operation. The present disclosure includes several ways/mechanisms for achieving this non-slidable (e.g., retaining) relationship between the core and the cylindrical rod. For example, FIGS. 5-12 show various ways for configuring the core and cylindrical rod in a non-slidable relationship. These include: end-welds (in FIGS. 5, 6 and 7), a longitudinal weld (in FIG. 8), a retention clip (in FIG. 9), a static friction enhancement feature (in FIG. 10), adhesive (in FIG. 11), and an end-stop feature (in FIG. 12).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus for use in a linear variable differential transformer (LVDT), the apparatus comprising:
    a core extending along a first longitudinal axis and having a C-shaped cross section in a plane normal to the first longitudinal axis, the core having: 1) a core inner diameter defining an inner surface of the core and defining a central lumen extending along the first longitudinal axis, and 2) a core outer diameter defining an outer surface of the core; and
    a cylindrical rod extending along a second longitudinal axis and having a rod outer diameter defining an outer surface of the cylindrical rod;
    wherein the cylindrical rod is configured to be received in the central lumen of the core, such that when the cylindrical rod is received in the central lumen of the core, a longitudinal gap extends from a proximal end of the core to a distal end of the core, and wherein a spot weld in direct contact with the core and the rod in the longitudinal gap is configured to mechanically secure the core directly to the rod, and wherein the core is fixedly coupled to the cylindrical rod in a non-slidable relationship, preventing displacement of the core relative to the cylindrical rod during operation; and
    wherein the core further comprises a ferromagnetic material.

2. The apparatus of claim 1, wherein the fixed coupling between the core and the cylindrical rod comprises an interference-fit coupling, such that the inner surface of the core makes intimate contact with the outer surface of the cylindrical rod due to a spring bias of the core.

3. The apparatus of claim 1, wherein the fixed coupling between the core and the cylindrical rod comprises a perimeter weld between the cylindrical rod and the core at a distal end of the core.

4. The apparatus of claim 1, further comprising a primary winding having a primary winding axis and two secondary windings having a secondary winding axis, wherein the primary winding axis and the secondary winding axis align with the first longitudinal axis when the primary and secondary windings are assembled with the core.

5. The apparatus of claim 4, further comprising a core housing having a core housing axis configured to align with the first longitudinal axis when the core housing is assembled with the core.

6. The apparatus of claim 1, wherein the core comprises a nickel-iron alloy material.

7. The apparatus of claim 1, further comprising a C-shaped clip configured to mate with a circumferential groove disposed along the outer surface of the core at a distal end of the core for retaining the core on the cylindrical rod when the cylindrical rod is assembled with the core.

8. The apparatus of claim 1, wherein the cylindrical rod further comprises a knurling pattern disposed on the outer surface of the cylindrical rod, the knurling pattern configured to provide for increased static friction between the outer surface of the cylindrical rod and the inner surface of the core when the cylindrical rod is assembled with the core.

9. The apparatus of claim 1, further comprising an end stop fixedly coupled to a distal end of the cylindrical rod, the end stop being configured to retain the core on the cylindrical rod when the cylindrical rod is assembled with the core.

10. An apparatus for use in a linear variable differential transformer (LVDT), the apparatus comprising:
    a core extending along a first longitudinal axis and having a C-shaped cross section in a plane normal to the first longitudinal axis, the core having: 1) a core inner diameter defining an inner surface of the core and defining a central lumen extending along the first longitudinal axis, and 2) a core outer diameter defining an outer surface of the core; and
    a cylindrical rod extending along a second longitudinal axis and having a rod outer diameter defining an outer surface of the cylindrical rod;
    wherein the cylindrical rod is configured to be received in the central lumen of the core, such that when the cylindrical rod is received in the central lumen of the core, a longitudinal gap extends from a proximal end of the core to a distal end of the core, and wherein a spot weld in direct contact with the core and the rod in the longitudinal gap is configured to mechanically secure the core directly to the rod, and wherein the core is fixedly coupled to the cylindrical rod in a non-slidable relationship, preventing displacement of the core relative to the cylindrical rod during operation.

11. The apparatus of claim 10, further comprising a primary winding having a primary winding axis and two secondary windings having a secondary winding axis, wherein the primary winding axis and the secondary winding axis align with the first longitudinal axis when the primary and secondary windings are assembled with the core.

12. The apparatus of claim 11, further comprising a core housing having a core housing axis configured to align with the first longitudinal axis when the core housing is assembled with the core.

13. The apparatus of claim 10, wherein the core comprises a ferromagnetic material.

14. The apparatus of claim 10, wherein the core comprises a nickel-iron alloy material.

15. An apparatus for use in a linear variable differential transformer (LVDT), the apparatus comprising:
    a core extending along a first longitudinal axis and having a C-shaped cross section in a plane normal to the first longitudinal axis, the core having: 1) a core inner diameter defining an inner surface of the core and defining a central lumen extending along the first longitudinal axis, and 2) a core outer diameter defining an outer surface of the core;
    a cylindrical rod extending along a second longitudinal axis and having a rod outer diameter defining an outer surface of the cylindrical rod, and
    means for retaining the core on the cylindrical rod;
    wherein the cylindrical rod is configured to be received in the central lumen of the core, such that when the cylindrical rod is received in the central lumen of the core, a longitudinal gap extends from a proximal end of the core to a distal end of the core, and wherein a spot weld in direct contact with the core and the rod in the longitudinal gap is configured to mechanically secure the core directly to the rod, and wherein the core is fixed relative to the cylindrical rod in a non-slidable relationship, preventing displacement of the core relative to the cylindrical rod during operation.

16. The apparatus of claim 15, further comprising a primary winding having a primary winding axis and two secondary windings having a secondary winding axis, wherein the primary winding axis and the secondary winding axis align with the first longitudinal axis when the primary and secondary windings are assembled with the core.

17. The apparatus of claim 16, further comprising a core housing having a core housing axis configured to align with the first longitudinal axis when the core housing is assembled with the core.

18. The apparatus of claim 15, wherein the core comprises a ferromagnetic material.

19. The apparatus of claim 15, wherein the core comprises a nickel-iron alloy material.

\* \* \* \* \*